US006336091B1

(12) United States Patent
Polikaitis et al.

(10) Patent No.: US 6,336,091 B1
(45) Date of Patent: Jan. 1, 2002

(54) COMMUNICATION DEVICE FOR SCREENING SPEECH RECOGNIZER INPUT

(75) Inventors: Audrius Polikaitis, Lemont; William Kushner, Arlington Heights, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/235,956

(22) Filed: Jan. 22, 1999

(51) Int. Cl.[7] ..................... G10L 15/20
(52) U.S. Cl. ..................... 704/233; 704/275
(58) Field of Search ..................... 704/200, 201, 704/226–228, 233, 275; 379/406.07; 455/566, 550

(56) References Cited

U.S. PATENT DOCUMENTS

| | | | | |
|---|---|---|---|---|
| 5,293,588 A | * | 3/1994 | Satoh et al. | 704/233 |
| 5,596,680 A | * | 1/1997 | Chow et al. | 704/248 |
| 5,668,871 A | * | 9/1997 | Urbanski | 379/406.07 |
| 5,878,353 A | * | 3/1999 | Azam et al. | 455/550 |
| 6,021,385 A | * | 2/2000 | Jarvinen et al. | 704/219 |
| 6,285,757 | * | 9/2001 | Carroll et al. | 345/619 |

OTHER PUBLICATIONS

Phillips User Manual, "Genie™", May 1997, pp. 1–62.

Sprint PCS User Guide, Sprint PCS Phone SCH–2000, 1998, pp 1–92.

Motorola digital Voice Caller Manual, 1992, pp. 1–12.

* cited by examiner

*Primary Examiner*—David D. Knepper
(74) *Attorney, Agent, or Firm*—Brian M. Mancini

(57) ABSTRACT

A communication device capable of screening speech recognizer input includes a microprocessor (110) connected to communication interface circuitry (115), memory (120), audio circuitry (130), an optional keypad (140), a display (150), and a vibrator/buzzer (160). Audio circuitry (130) is connected to microphone (133) and speaker (135). Microprocessor (110) includes a speech/noise classifier and speech recognition technology. Microprocessor (110) analyzes a speech signal to determine speech waveform parameters within a speech acquisition window. Microprocessor (110) compares the speech waveform parameters to determine whether an error exists in the signal format of the speech signal. Microprocessor (110) informs the user when an error exists in the signal format and instructs the user how to correct the signal format to eliminate the error.

34 Claims, 4 Drawing Sheets

COMMUNICATION DEVICE FOR SCREENING SPEECH RECOGNIZER INPUT

FIELD OF THE INVENTION

The present invention relates generally to electronic devices with speech recognition technology. More particularly, the present invention relates to portable communication devices having voice input and control capabilities.

BACKGROUND OF THE INVENTION

As the demand for smaller, more portable electronic devices grows, consumers want additional features that enhance and expand the use of portable electronic devices. These electronic devices include compact disc players, two-way radios, cellular telephones, computers, personal organizers, and similar devices. In particular, consumers want to input information and control the electronic device using voice communication alone. It is understood that voice communication includes speech, acoustic, and other non-contact communication. With voice input and control, a user may operate the electronic device without touching the device and may input information and control commands at a faster rate than a keypad. Moreover, voice-input-and-control devices eliminate the need for a keypad and other direct-contact input, thus permitting even smaller electronic devices.

Voice-input-and-control devices require proper operation of the underlying speech recognition technology. If the limitations of speech recognition technology are not observed, then the electronic device will not perform satisfactorily. Basically, speech recognition technology analyzes a speech waveform within a speech data acquisition window for matching the waveform to a particular word or command. If a match is found, then the speech recognition technology provides a signal to the electronic device identifying the particular word or command.

For speech recognition technology to provide suitable results, a user must speak at a reasonable volume within the data acquisition window. Although the speech recognition technology may operate correctly, the results from its use are dependent upon the actual speech waveform acquired in the speech data acquisition window. Consequently, speech recognition technology does not work well or at all when: (1) the user speaks over the start of the speech acquisition window; (2) the user speaks over the end of the speech acquisition window; (3) the user speaks too loudly; (4) the user speaks too softly; (5) the user does not say anything; (6) additional noise is present including impulsive, tonal, or wind noise; and (7) similar situations where the acquired speech waveform is not the complete waveform spoken by the user. Moreover, speech recognition technology may recognize an "incomplete" waveform as another word. In this situation, the speech recognition technology would signal the wrong word or command to the electronic device.

The prior art does not thoroughly screen the acquired speech input for proper speech signal format prior to processing by the speech recognition technology. Some references describe using a meter or light to indicate acquired signal amplitude levels. However, these amplitude levels cover only the "loudness" of the acquired speech waveform. Moreover, this type of "loudness" indication includes both the user's speech and noise. When the noise is louder than the user's speech, these indicators would show erroneously that the user is speaking at a proper volume. Furthermore, the prior art does not test the signal to determine whether the user spoke too soon, too late, or too quietly. The impact of signal truncation or inadequate signal to noise ratio is not considered. As a result, the prior art uses acquired speech "as is" with little or no feedback to the user regarding how to improve the speech input format.

Accordingly, there is a need to thoroughly screen the speech input into a voice-input-and-control device for proper speech format prior to processing in the speech recognition technology. There also is a need to provide feedback instructing the user how to improve the speech input for optimizing the speech recognition of the electronic device.

SUMMARY OF THE INVENTION

The primary object of the present invention is to provide a communication device and method for screening speech signals for proper formatting prior to speech recognition processing. Another object of the present invention is to inform the user of errors associated with the speech signal format. Another object of the present invention is to provide the user with instructions for correcting errors associated with the speech signal format. This corrective feedback helps the user minimize future unsuitable speech input and improves the overall recognition accuracy and user satisfaction. As discussed in greater detail below, the present invention overcomes the limitations of the existing art to achieve these objects and other benefits.

The present invention provides a communication device capable of screening speech signals prior to speech recognition processing. The communication device includes a microprocessor connected to communication interface circuitry, audio circuitry, memory, an optional keypad, a display, and a vibrator/buzzer. The audio circuitry is connected to a microphone and a speaker. The audio circuitry includes filtering and amplifying circuitry and an analog-to-digital converter. The microprocessor includes a speech/noise classifier and speech recognition technology.

The microprocessor analyzes a speech signal to determine speech waveform parameters within a speech acquisition window. The speech waveform parameters include speech energy, noise energy, start energy, end energy, the percentage of clipped speech samples, and other speech or signal related parameters within the speech acquisition window.

By comparing speech waveform parameters with threshold values, the microprocessor determines whether an error exists in the signal format of the speech signal. The microprocessor provides error information to the user when an error exists in the signal format. The microprocessor may deactivate or halt the speech recognition processing so the user may correct the error in the speech signal format. Alternatively, the microprocessor may permit the speech recognition processing to continue with a warning that the speech recognition output may be incorrect due to the error in the speech signal format.

BRIEF DESCRIPTION OF THE DRAWINGS

The present invention is better understood when read in light of the accompanying drawings, in which.

DETAILED DESCRIPTION OF THE INVENTION

Figure 1:
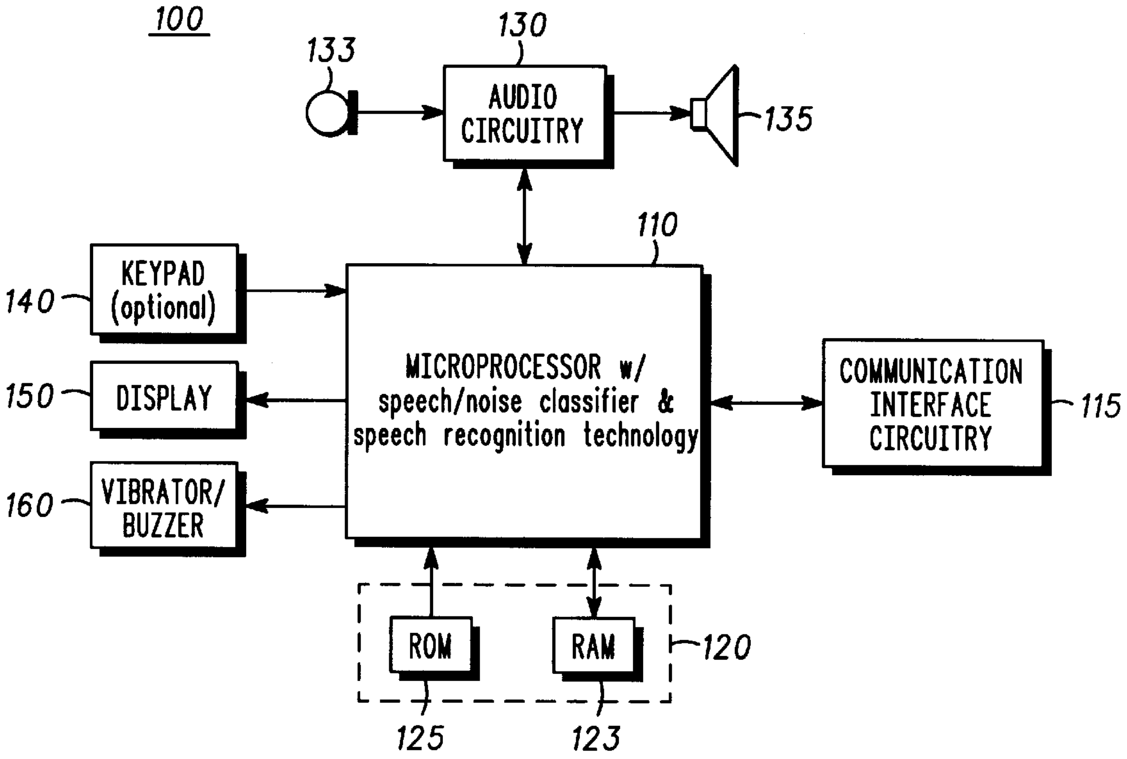
FIG. 1 is a block diagram of a communication device capable of screening speech recognizer input according to the present invention.

FIG. 1 is a block diagram of a communication device 100 according to the present invention. Communication device 100 may be a cellular telephone, a portable telephone handset, a two-way radio, a data interface for a computer or personal organizer, or similar electronic device. Communication device 100 includes microprocessor 110 connected to communication interface circuitry 115, memory 120, audio circuitry 130, keypad 140, display 150, and vibrator/buzzer 160.

The microprocessor 110 may be any type of microprocessor including a digital signal processor or other type of digital computing engine. Preferably, microprocessor 110 includes a speech/noise classifier and speech recognition technology. One or more additional microprocessors (not shown) may be used to provide the speech/noise classifier and speech recognition technology.

Communication interface circuitry 115 is connected to microprocessor 110. The communication interface circuitry is for sending and receiving data. In a cellular telephone, communication interface circuitry 115 would include a transmitter, receiver, and an antenna. In a computer, communication interface circuitry 115 would include a data link to the central processing unit.

Memory 120 may be any type of permanent or temporary memory such as random access memory (RAM), read-only memory (ROM), disk, and other types of electronic data storage either individually or in combination. Preferably, memory 120 has RAM 123 and ROM 125 connected to microprocessor 110.

Audio circuitry 130 is connected to microphone 133 and speaker 135, which may be in addition to another microphone or speaker found in communication device 100. Audio circuitry 130 preferably includes amplifying and filtering circuitry (not shown) and an analog-to-digital converter (not shown). While audio circuitry 130 is preferred, microphone 133 and speaker 130 may connect directly to microprocessor 110 when it performs all or part of the functions of audio circuitry 130.

Keypad 140 may be an phone keypad, a keyboard for a computer, a touch-screen display, or similar tactile input devices. However, keypad 140 is not required given the voice input and control capabilities of the present invention.

Display 150 may be an LED display, an LCD display, or another type of visual screen for displaying information from the microprocessor 110. Display 150 also may include a touch-screen display. An alternative (not shown) is to have separate touch-screen and visual screen displays.

In operation, audio circuitry 130 receives voice communication via microphone 133 during a speech acquisition window set by microprocessor 110. The speech acquisition window is a predetermined time period for receiving voice communication. The duration of the length of the speech acquisition window is constrained by the amount of available memory in memory 120. While any time period may be selected, the speech acquisition window is preferably in the range of 1 to 5 seconds.

Voice communication includes speech, other acoustic communication, and noise. The noise may be background noise and noise generated by the user including impulsive noise (pops, clicks, bangs, etc.), tonal noise (whistles, beeps, rings, etc.), or wind noise (breath, other air flow, etc.).

Audio circuitry 130 preferably filters and digitizes the voice communication prior to sending it as a speech signal to microprocessor 110. The microprocessor 110 stores the speech signal in memory 120.

Microprocessor 110 analyzes the speech signal prior to processing it with speech recognition technology. Microprocessor 110 segments the speech acquisition window into frames. While frames of any time duration may be used, frames of an equal time duration and 10 ms are preferred. For each frame, microprocessor 110 determines frameEnergy. frameEnergy is the amount of energy in a particular frame and may be calculated using the following equation:

$$frameEnergy_m = \sum_{l=1}^{L} inputSample^2_{\{m,l\}}$$

inputSample is a sample of the speech waveform. I is the sample number. m is the frame number. L is the total number of samples.

In addition, microprocessor 110 numbers each frame sequentially from 1 through the total number of frames, M. Although the frames may be numbered with the flow (left to right) or against the flow (right to left) of the speech waveform, the frames are preferably numbered with the flow of the waveform. Consequently, each frame has a frame number, m, corresponding to the position of the frame in the speech acquisition window.

Microprocessor 110 has a speech/noise classifier for determining whether each frame is speech or noise. Any speech/noise classifier may be used. However, the performance of the present invention improves as the accuracy of the classifier increases. If the classifier identifies a frame as speech, the classifier assigns the frame an SNflag of 1. If the classifier identifies a frame as noise, the classifier assigns the frame an SNflag of 0. SNflag is a control value used to classify the frames.

Microprocessor 110 then determines additional speech waveform parameters of the speech signal according to the following equations:

$$StartEnergy = \frac{1}{N}\sum_{m=1}^{N} frameEnergy_m$$

StartEnergy is the average energy in the first N frames of the speech acquisition window. frameEnergy is the amount of energy in a frame. m is the frame number. While N may be any number of frames less than the total number of frames, N is preferably in the range of 5 to 30.

$$EndEnergy = \frac{1}{N}\sum_{m=M-N+1}^{M} frameEnergy_m$$

EndEnergy is the average energy in the last N frames of the speech acquisition window. frameEnergy is the amount of energy in a frame. m is the frame number. M is the total number of frames. While N may be any number of frames less than the total number of frames, N is preferably in the range of 5 to 30.

$$SpeechEnergy = \frac{1}{TotalSpeechFrames}\sum_{m=1}^{M} SNflag_m \cdot frameEnergy_m$$

SpeechEnergy is the average energy of all speech frames as designated by an SNflag value equal to 1. TotalSpeechFrames is the total number of frames designated as speech frames. frameEnergy is the amount of energy in a frame. m is the frame number. M is the total number of frames.

$$NoiseEnergy = \frac{1}{TotalNoiseFrames}\sum_{m=1}^{M} \overline{SNflag_m} \cdot frameEnergy_m$$

NoiseEnergy is the average energy of all the noise frames as designated by an SNflag value equal to 0. The NoiseEnergy equation inverts the SNflag value to include the noise frames in the calculation. TotalNoiseFrames is the total number of frames designated as noise frames. frameEnergy is the amount of energy in a frame. m is the frame number. M is the total number of frames.

$$PercentClipped = \frac{\sum_{m=1}^{M}\left(\left[\sum_{l=1}^{L} ClippedSample_{\{m,l\}} \cdot SNflag_m\right]\right)}{TotalSpeechFrames \cdot frameLength}$$

PercentClipped is the percentage of speech samples exceeding the minimum and maximum voltage range of the analog-to-digital converter in audio circuitry 130. ClippedSample is a speech sample within a frame exceeding the minimum and maximum voltage range of the analog-to-digital converter. TotalSpeechFrames is the total number of frames designated as speech frames by SNflag. frameEnergy is the amount of energy in a frame. m is the frame number. I is the sample number. M is the total number of frames. L is the total number samples. frameLength is the number of speech samples within a frame.

In addition to these parameters, microprocessor 110 may determine other speech or signal related parameters that may be used to identify errors with the speech waveform. After the speech waveform parameters are determined, microprocessor 110 finishes screening the speech signal.

Figure 2:
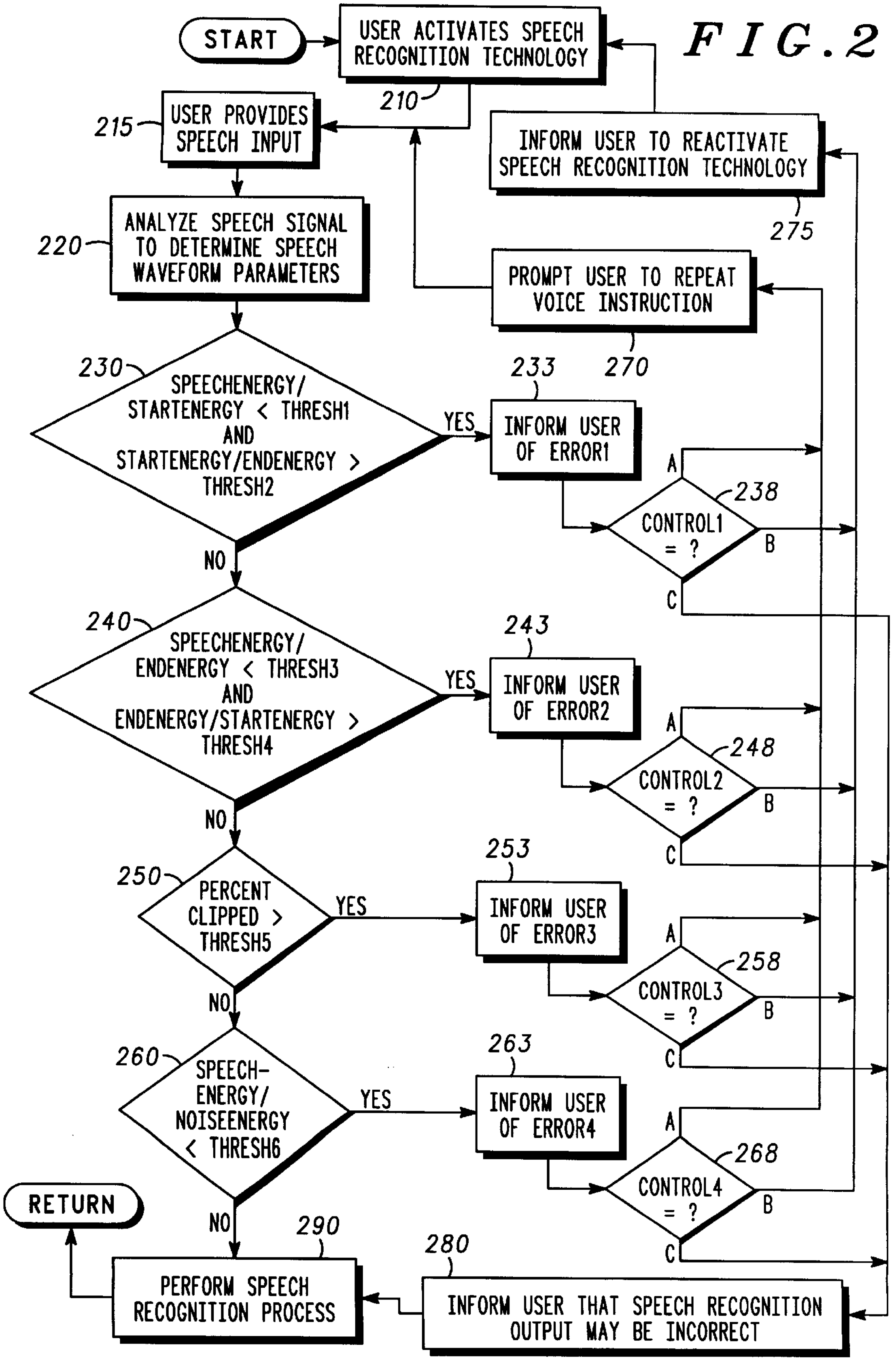
FIG. 2 is a flowchart describing a first embodiment of screening speech recognizer input according to the present invention.

FIG. 2 is a flowchart describing the screening of the speech signal. In step 210, the user activates the speech recognition technology, which may happen automatically when the communication device 100 is turned-on. Alternatively, the user may trigger a mechanical or electrical switch or use a voice command to activate the speech recognition technology.

In step 215, the user provides speech input into microphone 133. The start and end of the speech acquisition window may be signaled by microprocessor 110. The signal may be a beep through speaker 135, a printed or flashing message on display 150, a buzz or vibration through vibrator/buzzer 160, or similar alert. The method proceeds to step 220, where microprocessor 110 analyzes the speech signal to determine the speech waveform parameters previously discussed.

Microprocessor 110 compares the speech waveform parameters in steps 230, 240, 250, and 260 to determine whether the speech signal format is problem-free for speech recognition processing. While these steps may be performed in any sequence, they are performed preferably in the sequence given. This sequence represents a hierarchical decision structure that optimally identifies any errors with the speech signal format. Although a different sequence may identify an error exists, the different sequence may misidentify the type of error. If step 260 preceded step 230 and the user spoke over the start of the speech acquisition window, microprocessor 110 would misidentify the error as the user speaking too softly. Consequently, a difference sequence may result in the misidentification of errors with the speech signal format.

Figure 4:
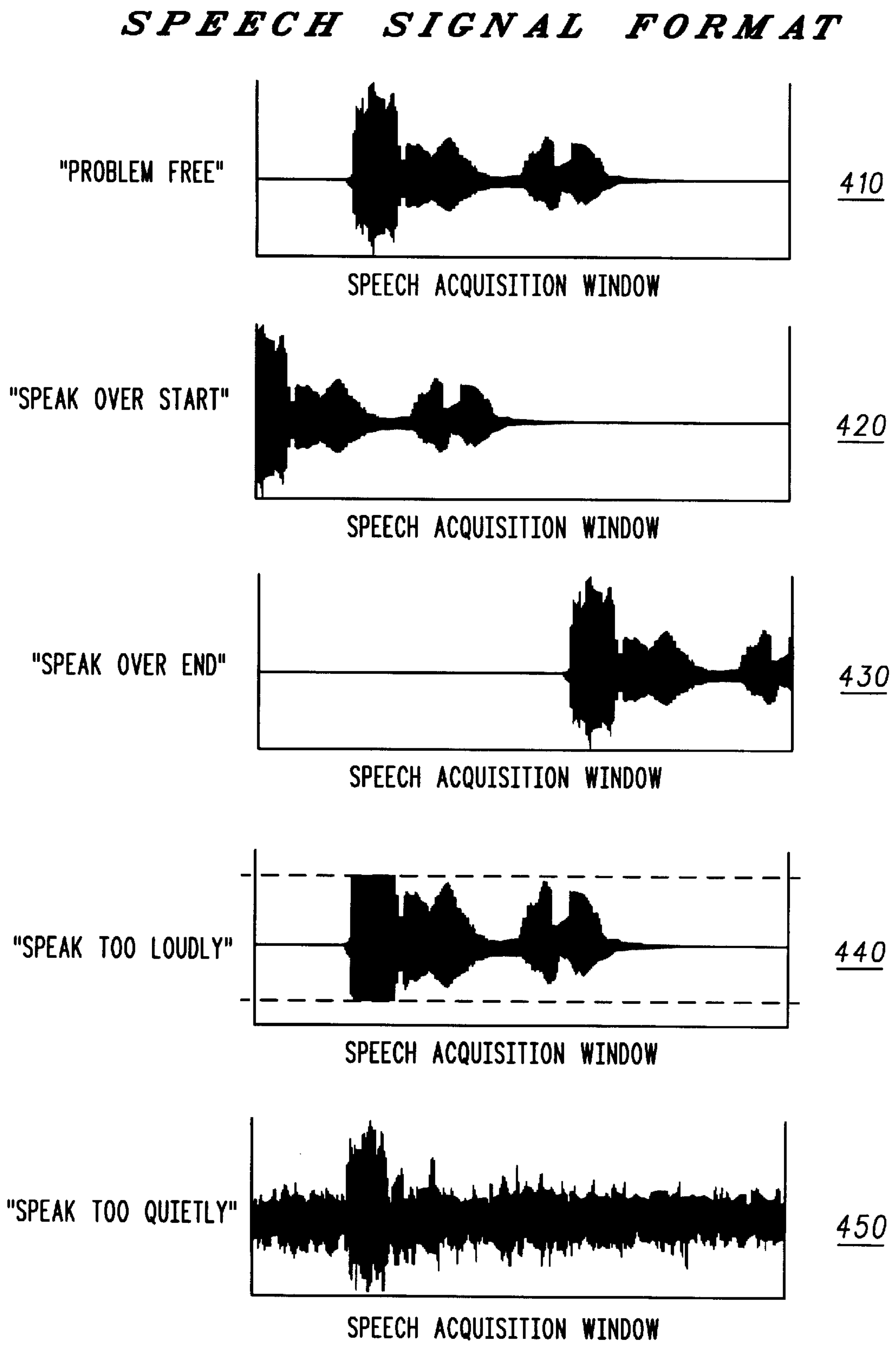
FIG. 4 shows various charts of the speech signal format within the speech acquisition window.

Proper speech signal format occurs when the speech waveform is problem-free as shown in chart 410 of FIG. 4. The speech waveform is completely within the speech acquisition window. The user did not speak over the start or the end of the speech acquisition window. The user did not speak too loudly, which would have caused the speech waveform to be clipped by the analog-to-digital converter. The user did not speak too softly for the speech to be obscured by noise.

Charts 410 through 450 in FIG. 4 show speech signal format problems. In chart 420, the user spoke over the start of the speech acquisition window. In chart 430, the user spoke over the end of the speech acquisition window. In chart 440, the user is speaking too loudly, thus causing the analog-to-digital converter to clip the speech waveform. In chart 450, the user is speaking too softly, thus permitting noise to obscure the speech waveform.

Returning to step 230 in FIG. 2, microprocessor 110 compares the speech waveform parameters to determine whether the user spoke over the start of the speech acquisition window, Error1. When the ratio of SpeechEnergy to StartEnergy is less than a first threshold value, Thresh1, the first few frames in the speech acquisition window contain substantial energy. When this situation occurs and the ratio of StartEnergy to EndEnergy is greater than a second threshold value, Thresh2, the substantial energy present at the start is now absent from the end of the speech acquisition window. These conditions show the user spoke over the start of the speech acquisition window. Thresh1 and Thresh2 are set by the manufacturer preferably. However, the user may set or change the values of Thresh1 and Thresh2. While any values may be used for Thresh1, Thresh1 is preferably in the range of 6 dB–18 dB. While any values may be used for Thresh2, Thresh2 is preferably in the range of 9 dB–21 dB.

In step 233, microprocessor 110 informs the user that Error1 has occurred. Microprocessor 110 communicates the Error1 information via the communication output mechanisms—communication interface circuitry 115, speaker 135, display 150, and vibrator/buzzer 160. The information may be communicated through a single output device or any combination of output devices.

In step 238, microprocessor 110 retrieves Control1 stored in memory 120. Control1 is a control value for selecting a response to Error1. Control1 is set preferably by the manufacturer, but may be set or changed by the user. Control1 may be unchangeable to fix the response permanently to one option. As an alternate, step 238 may be omitted to set the response permanently to one option. In this alternate, step 233 would proceed directly to either step 270, step 275, or step 280.

If Control1 is option A, the user is prompted in step 270 to repeat the voice instruction and is prompted to speak after the start of the speech acquisition window. The method returns to step 215 for the user to provide speech input.

If Control1 is option B, the user is prompted in step 275 to reactivate the speech recognition technology and is instructed to speak after the start of the speech acquisition window. The method returns to step 210 for the user to activate the speech recognition technology.

If Control1 is option C, the user is informed in step 280 that the speech recognition output may be incorrect due to Error1. The method proceeds to step 290 for performance of the speech recognition process. While steps 233 and 280 precede step 290 in this scenario, the user may be informed of these errors after rather than before the speech recognition process in step 290.

In step 230, if the ratio of SpeechEnergy to StartEnergy is greater than or equal to Thresh1 or the ratio of StartEnergy to EndEnergy is less than or equal to Thresh2, then the method proceeds to step 240.

In step 240, microprocessor 110 compares the speech waveform parameters to determine whether the user spoke over the end of the speech acquisition window, Error2. If the ratio of SpeechEnergy to EndEnergy is less than a third threshold value, Thresh3, the last few frames of the speech acquisition window contain substantial energy. When this situation occurs and the ratio of EndEnergy to StartEnergy is greater than a fourth threshold value, Thresh4, then the substantial energy present at the end of the speech acquisition window is due to speech and not noise. These conditions show the user spoke over the end of the speech acquisition window. Thresh3 and Thresh4 are set by the manufacturer preferably. However, the user may set or change the values of Thresh3 and Thresh4. While any values may be used for Thresh3, Thresh3 is preferably in the range of 6 dB–18 dB. While any values may be used for Thresh4, Thresh4 is preferably in the range of 9 dB–21 dB.

In step 243, microprocessor 110 informs the user that Error 2 has occurred. Microprocessor 110 communicates the Error2 information via the communication output mechanisms—communication interface circuitry 115, speaker, display 150, and vibrator/buzzer 160. The information may be communicated through a single output device or any combination of output devices.

In step 248, microprocessor 110 retrieves Control2 stored in memory 120. Control2 is a control value for selecting a response to Error2. Control2 is set preferably by the manufacturer, but may be set or changed by the user. Control1 may be unchangeable to fix the response permanently to one option. As an alternate, step 248 may be omitted to set the response permanently to one option. In this alternate, step 243 would proceed directly to either step 270, step 275, or step 280.

If Control2 is option A, the user is prompted in step 270 to repeat the voice instruction and is prompted to finish speaking before the end of the speech acquisition window. The method returns to step 215 for the user to provide speech input.

If Control2 is option B, the user is prompted in step 275 to reactivate the speech recognition technology and is instructed to finish speaking before the end of the speech acquisition window. The method returns to step 210 for the user to activate the speech recognition technology.

If Control2 is option C, the user is informed in step 280 that the speech recognition output may be incorrect due to Error2. The method proceeds to step 290 for performance of the speech recognition process. While steps 243 and 280 precede step 290 in this scenario, the user may be informed of these errors after rather than before the speech recognition process in step 290.

In step 240, if the ratio of SpeechEnergy to EndEnergy is greater than or equal to Thresh3 or the ratio of EndEnergy to StartEnergy is less than or equal to Thresh4, then the method proceeds to step 250.

In step 250, microprocessor 110 compares the speech waveform parameters to determine whether the user spoke too loudly, Error3. If PercentClipped is greater than a fifth threshold value, Thresh5, then a portion of the speech signal is being clipped by the analog-to-digital converter. This condition shows the user spoke too loudly. Thresh5 is set by the manufacturer preferably. However, the user may set or change the value of Thresh5. While any values may be used for Thresh5, Thresh1 is preferably in the range of 0.10–0.40.

In step 253, microprocessor 110 informs the user that Error3 has occurred. Microprocessor 110 communicates the Error3 information via the communication output mechanisms—communication interface circuitry 115, speaker 135, display 150, and vibrator/buzzer 160. The information may be communicated through a single output device or any combination of output devices.

In step 258, microprocessor 110 retrieves Control3 stored in memory 120. Control3 is a control value for selecting a response to Error3. Control3 is set preferably by the manufacturer, but may be set or changed by the user. Control3 may be unchangeable to fix the response permanently to one option. As an alternate, step 258 may be omitted to set the response permanently to one option. In this alternate, step 243 would proceed directly to either step 270, step 275, or step 280.

If Control3 is option A, the user is prompted in step 270 to repeat the voice instruction and is prompted to speak softer. The method returns to step 215 for the user to provide speech input.

If Control3 is option B, the user is prompted in step 275 to reactivate the speech recognition technology and is instructed to speak softer. The method returns to step 210 for the user to activate the speech recognition technology.

If Control3 is option C, the user is informed in step 280 that the speech recognition output may be incorrect due to Error3. The method proceeds to step 290 for performance of the speech recognition process. While steps 253 and 280 precede step 290 in this scenario, the user may be informed of these errors after rather than before the speech recognition process in step 290.

In step 250, if PercentClipped is less than or equal to Thresh5, then the method proceeds to step 260.

In step 260, microprocessor 110 compares the speech waveform parameters to determine whether the user spoke too softly, Error4. If the ratio of SpeechEnergy to NoiseEnergy is less than a sixth threshold value, Thresh6, then the speech signal is obscured by noise. This condition shows the user spoke too softly. Thresh6 is set by the manufacturer preferably. However, the user may set or change the value of Thresh6. While any values may be used for Thresh6, Thresh6 is preferably in the range of 6 dB–24 dB.

In step 263, microprocessor 110 informs the user that Error 4 has occurred. Microprocessor 110 communicates Error4 information via the communication output mechanisms—communication interface circuitry 115, speaker 135, display 150, and vibrator/buzzer 160. The information may be communicated through a single output device or any combination of output devices.

In step 268, microprocessor 110 retrieves Control4 stored in memory 120. Control4 is a control value for selecting a response to Error4. Control4 and is set preferably by the manufacturer, may be set or changed by the user. Control4 may be unchangeable to fix the response permanently to one option. As an alternate, step 268 may be omitted to set the response permanently to one option. In this alternate, step 263 would proceed directly to either step 270, step 275, or step 280.

If Control4 is option A, the user is prompted in step 270 to repeat the voice instruction and is prompted to speak louder. The method returns to step 215 for the user to provide speech input.

If Control4 is option B, the user is prompted in step 275 to reactivate the speech recognition technology and is instructed to speak louder. The method returns to step 210 for the user to activate the speech recognition technology.

If Control4 is option C, the user is informed in step 280 that the speech recognition output may be incorrect due to Error4. The method proceeds to step 290 for performance of the speech recognition process. While steps 263 and 280 precede step 290 in this scenario, the user may be informed of these errors after rather than before the speech recognition process in step 290.

In step 260, if the ratio of SpeechEnergy to NoiseEnergy is greater than or equal to Thresh6, then the method proceeds to step 290.

In steps 270, 275, and 280, microprocessor 110 may communicate to the user through the communication output mechanisms—communication interface circuitry 115, speaker 135, display 150, and vibrator/buzzer 160. Microprocessor 110 may use a single output device or any combination of output devices to communicate the prompts, instructions, and information to the user.

At step 290, microprocessor 110 performs the speech recognition process on the speech signal for transmission of a speech recognition signal to the communication interface circuitry 115. The method then returns to start for the next speech input.

Figure 3:
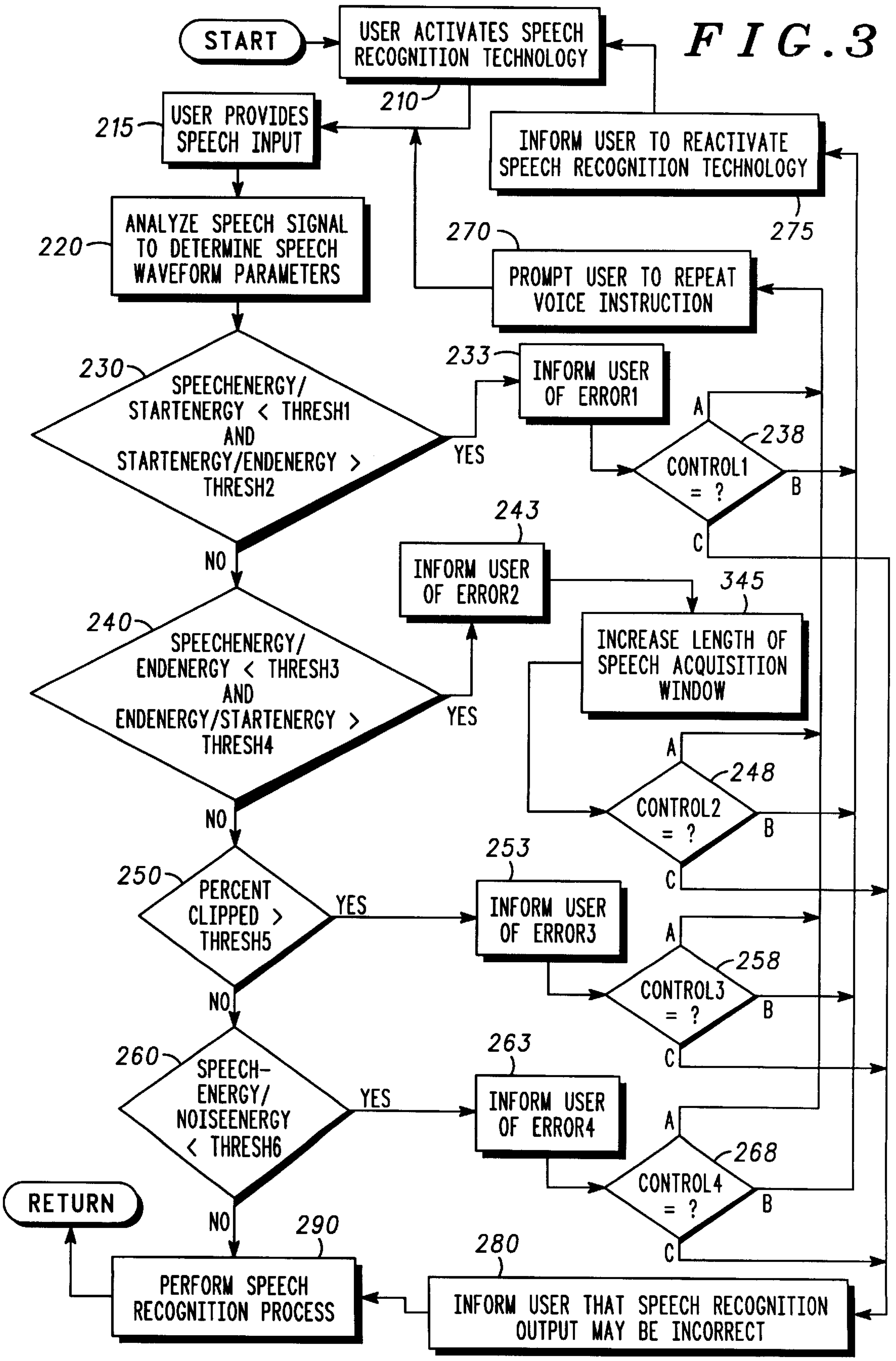
FIG. 3 is a flowchart describing an alternate embodiment of screening speech recognizer input according to the present invention.

FIG. 3 is a flowchart of an alternative embodiment of the present invention. It includes all of the steps in FIG. 2. It also includes step 345 to expand the speech acquisition window in response to the user speaking over the end of the window, Error2. After microprocessor 110 informs the user of Error2 in step 243, the alternate embodiment proceeds to step 345.

In step 345, microprocessor 110 increases the length of the speech acquisition window. The increase is constrained by the available memory in memory 120. While the increase may be any amount up to the available memory, the increase is preferably equal to 25 percent of the length of speech acquisition window. Microprocessor 110 may inform the user of the change in length of the speech acquisition window. The speech acquisition window may be increased after any number of Error2 type errors. Preferably, the speech acquisition window is increased after two sequential Error2 type errors. The method continues with step 248 as in FIG. 2.

The present invention has been described in connection with the embodiments shown in the figures. However, other embodiments may be used and changes may be made for performing the same function of the invention without deviating from it. Therefore, it is intended in the appended claims to cover all such changes and modifications that fall within the spirit and scope of the invention. Consequently, the present invention is not limited to any single embodiment and should be construed to the extent and scope of the appended claims.

What is claimed is:

1. A communication device capable of screening speech recognizer input, comprising:

at least one microprocessor having a speech/noise classifier, wherein the at least one microprocessor analyzes a speech signal to determine speech waveform parameters within a speech acquisition window, wherein the at least one microprocessor compares speech waveform parameters to determine whether an error exists in the signal format of the speech signal, and wherein the at least one microprocessor provides error information when an error exists in the signal format of the speech signal;

a microphone for providing the speech signal to the at least one microprocessor; and means, operatively connected to the at least one microprocessor, for communicating the error information from the at least one microprocessor.

2. A communication device capable of screening speech recognizer input according to claim 1, wherein the at least one microprocessor provides instructions for correcting the error, and the communication device comprises means for communicating the instructions from the at least one microprocessor.

3. A communication device capable of screening speech recognizer input according to claim 2, wherein the means for communicating the error information and the means for communicating the instructions are at least one communication output mechanism.

4. A communication device capable of screening speech recognizer input according to claim 3, wherein the at least one communication output mechanism is a speaker.

5. A communication device capable of screening speech recognizer input according to claim 3, wherein the at least one communication output mechanism is a display.

6. A communication device capable of screening speech recognizer input according to claim 1, wherein the error comprises the user speaking over the start of the speech acquisition window.

7. A communication device capable of screening speech recognizer input according to claim 1, wherein the error comprises the user speaking over the end of the speech acquisition window.

8. A communication device capable of screening speech recognizer input according to claim 1, wherein the speech signal comprises noise and speech communication.

9. A communication device capable of screening speech recognizer input according to claim 8, wherein the error comprises the noise obscuring the speech communication when a ratio of the speech communication to the noise is less than a threshold.

10. A communication device capable of screening speech recognizer input according to claim 1, wherein the means for communicating the error information comprises a speaker.

11. A communication device capable of screening speech recognizer input according to claim 1, wherein the means for communicating the error information is a display.

12. A communication device capable of screening speech recognizer input according to claim 1, wherein the means for communicating the error information comprises a vibrator/buzzer.

13. A communication device capable of screening speech recognizer input according to claim 1, wherein the means for communicating the error information comprises a display and a speaker.

14. A communication device capable of screening speech recognizer input according to claim 1, further comprising:

audio circuitry operatively connected to the microphone and at least one microprocessor, the audio circuitry having an analog-to-digital converter.

15. A communication device capable of screening speech recognizer input according to claim 14, wherein the error comprises at least one speech sample clipped by the analog-to-digital converter.

16. A communication device capable of screening speech recognizer input according to claim 1, further comprising a memory operatively connected to the at least one microprocessor.

17. A communication device capable of screening speech recognizer input according to claim 1, wherein the at least one microprocessor has speech recognition technology, and wherein the at least one microprocessor uses the speech recognition technology to produce a speech recognition signal from the speech signal.

18. A communication device capable of screening speech recognizer input according to claim 17, further comprising:

communication interface circuitry operatively connected to receive the speech recognition signal from the at least one microprocessor.

19. A method for screening speech recognizer input, comprising the steps of:

(a) analyzing a speech signal to determine speech waveform parameters within a speech acquisition window;

(b) comparing the speech waveform parameters to determine whether an error exists in the signal format of the speech signal; and (c) when an error exists in the signal format of the speech signal, providing error information.

20. A method for screening speech recognizer input according to claim 19, wherein step (c) comprises the substep (c1) providing information that the speech recognition output may be incorrect due to the error in the signal format of the speech signal.

21. A method for screening speech recognizer input according to claim 19, wherein step (c) further comprises the substeps of:

(c1) deactivating the speech recognition process;

(c2) prompting the user to reactivate the speech recognition process with instructions to correct the error in the signal format of the speech signal.

22. A method for screening speech recognizer input according to claim 19, wherein step (c) further comprises the substeps of:

(c1) halting the speech recognition process;

(c2) prompting the user to provide a corrected speech signal with instructions for correcting the error in the signal format of the speech signal;

(c3) repeating steps (a), (b), and (c) for the corrected speech signal.

23. A method for screening speech recognizer input according to claim 19, wherein the speech waveform parameters in step (a) include speech energy, noise energy, start energy, end energy, and a percentage of clipped speech samples within the speech acquisition window.

24. A method for screening speech recognizer input according to claim 23, wherein the step (b) of comparing the speech waveform parameters comprises the substeps of:

(b1) determining whether the ratio of the speech energy to the start energy is less than a first threshold and whether the ratio of the start energy to the end energy is greater than a second threshold;

(b2) determining whether the ratio of the speech energy to the end energy is less than a third threshold and whether the ratio of the end energy to the start energy is greater than a fourth threshold;

(b3) determining whether the percentage of clipped speech samples is greater than a fifth threshold; and (b4) determining whether the ratio of the speech energy to the noise energy is less than a sixth threshold.

25. A method for screening speech recognizer input according to claim 19, wherein the substeps (b1), (b2), (b3), and (b4) are performed sequentially to provide a hierarchical decision structure.

26. A radiotelephone, comprising:

at least one microprocessor for screening speech recognizer input, the at least one microprocessor having a speech/noise classifier, wherein the at least one microprocessor analyzes a speech signal to determine speech waveform parameters within a speech acquisition window, wherein the speech waveform parameters include speech energy, noise energy, start energy, end energy, and a percentage of clipped speech samples within the speech acquisition window, wherein the at least one microprocessor compares speech waveform parameters to determine whether an error exists in the signal format of the speech signal, wherein the at least one microprocessor provides error information when an error exists in the signal format of the speech signal, and wherein the at least one microprocessor provides instructions for correcting the error;

a microphone for providing the speech signal to the at least one microprocessor;

audio circuitry operatively connected to the microphone and at least one microprocessor, the audio circuitry having an analog-to-digital converter;

a memory operatively connected to the at least one microprocessor; and means, operatively connected to the at least one microprocessor, for communicating error information and instructions for correcting the error.

27. A radiotelephone according to claim 26, wherein the at least one microprocessor compares the speech waveform parameters to determine whether the ratio of the speech energy to the start energy is less than a first threshold and whether the ratio of the start energy to the end energy is greater than a second threshold, wherein the at least one microprocessor compares the speech waveform parameters to determine whether the ratio of the speech energy to the end energy is less than a third threshold and whether the ratio of the end energy to the start energy is greater than a fourth threshold, wherein the at least one microprocessor compares the speech waveform parameters to determine whether the percentage of clipped speech samples is greater than a fifth threshold, and wherein the at least one microprocessor compares the speech waveform parameters to determine whether the ratio of the speech energy to the noise energy is less than a sixth threshold.

28. A radiotelephone according to claim 27, wherein the at least one microprocessor compares the speech waveform parameters according to the sequence in claim 27.

29. A radiotelephone according to claim 26, further comprising means for tactile data input.

30. A radiotelephone according to claim 29, wherein the means for tactile data input comprises a keypad.

31. A radiotelephone according to claim 26, wherein the means for communicating comprises a speaker.

32. A radiotelephone according to claim 26, wherein the means for communicating comprises a display.

33. A radiotelephone according to claim 26, wherein the at least one microprocessor has speech recognition technology, and wherein the at least one microprocessor uses the speech recognition technology to produce a speech recognition signal from the speech signal.

34. A radiotelephone according to claim 33, further comprising: communication interface circuitry operatively connected to receive the speech recognition signal from the at least one microprocessor.

* * * * *